US012783078B2

(12) United States Patent
Kuo et al.

(10) Patent No.: US 12,783,078 B2
(45) Date of Patent: Nov. 3, 2026

(54) TOUCH PANEL DISPLAY DEVICE COMPRISING A LIGHT GUIDE PLATE

(71) Applicant: E Ink Holdings Inc., Hsinchu (TW)

(72) Inventors: Yi-Chun Kuo, Hsinchu (TW); Chen-Cheng Lin, Hsinchu (TW); Hung-Wei Tseng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 19/071,742

(22) Filed: Mar. 5, 2025

(65) Prior Publication Data

US 2025/0306701 A1 Oct. 2, 2025

(30) Foreign Application Priority Data

Mar. 27, 2024 (TW) .................................. 113111559

(51) Int. Cl.
*G06F 3/041* (2006.01)
*F21V 8/00* (2006.01)
*G06F 3/044* (2006.01)

(52) U.S. Cl.
CPC ....... *G06F 3/04164* (2019.05); *G02B 6/0083* (2013.01); *G06F 3/0445* (2019.05); *G06F 2203/04103* (2013.01)

(58) Field of Classification Search
CPC ............... G06F 3/04164; G06F 3/0445; G06F 2203/04103; G02B 6/0083
USPC .......................................................... 345/172
See application file for complete search history.

(56) References Cited

U.S. PATENT DOCUMENTS

| | | | |
|---|---|---|---|
| 10,048,536 B2 | 8/2018 | Tsai et al. | |
| 10,386,572 B1 * | 8/2019 | Wan | H05K 1/0203 |
| 11,360,258 B1 | 6/2022 | Huwe et al. | |
| 11,579,481 B2 | 2/2023 | Xi et al. | |
| 2010/0060601 A1 | 3/2010 | Oohira | |
| 2012/0235948 A1 * | 9/2012 | Inoue | G02F 1/13338 345/173 |
| 2014/0285730 A1 | 9/2014 | Liu et al. | |
| 2016/0313490 A1 * | 10/2016 | Steijner | G02B 6/0021 |
| 2017/0300142 A1 | 10/2017 | Zeng | |

FOREIGN PATENT DOCUMENTS

| | | |
|---|---|---|
| TW | 201241512 A | 10/2012 |
| TW | 202324053 A | 6/2023 |

OTHER PUBLICATIONS

The office action of corresponding TW application No. 113111559 issued on Nov. 5, 2025.

* cited by examiner

*Primary Examiner* — Nathan P Brittingham
(74) *Attorney, Agent, or Firm* — CKC & Partners Co., LLC

(57) ABSTRACT

A panel device includes a light guide plate, a touch module, an adhesive layer, and a driving module. The light guide plate has a light emitting surface and a light incident surface. The touch module is disposed on the light emitting surface. The adhesive layer is disposed between the touch module and the light guide plate. The driving module is disposed between the touch module and the light guide plate, and includes a driving board, a touch control element, and a light emitting element. The driving board has a first surface and a second surface opposite to the first surface. The touch control element is disposed on the first surface and is electrically connected to the touch module. The light emitting element is disposed on the second surface and is adjacent to the light incident surface.

13 Claims, 4 Drawing Sheets

TOUCH PANEL DISPLAY DEVICE COMPRISING A LIGHT GUIDE PLATE

CROSS-REFERENCE TO RELATED APPLICATION

This application claims priority to Taiwan Application Serial Number 113111559, filed Mar. 27, 2024, which is herein incorporated by reference in its entirety.

BACKGROUND

Field of Invention

The present disclosure relates to a panel device.

Description of Related Art

In existing technology, a conventional touch panel device includes a touch module, a driving board connected to the touch module, an adhesive layer, a light guide module, and another driving board connected to the light guide module. However, during the integration process of existing components, limitations in thickness of the adhesive layer and the trace area often lead to mismatch problems, or the driving boards of different modules interfere with each other, thus affecting the performance and stability of the product. In view of this, how to provide a panel device that can solve the above-mentioned problems is still a goal of research and development in this field.

SUMMARY

At least one embodiment of the present disclosure provides a panel device that reduces the mechanical interference between different modules by integrating the driving module of the touch module and the driving module of the light guide plate. The panel device also adjusts the position of the driving module to ensure the normal driving functions of the touch module and the light guide plate, thereby reducing fitting tolerances and increasing stability. The trace area design of the panel device is adjustable that can be adjusted according to actual needs, thereby ensuring the trace efficiency and performance of the panel device. Furthermore, the panel device can ensure the maximum active area by optimizing the integration of the light guide plate and the driving module to achieve a narrow bezel.

The panel device according to at least one embodiment of the present disclosure has an active area and a peripheral area located at least one side of the active area, and includes a light guide plate, a touch module, an adhesive layer, and a driving module. The light guide plate has a light emitting surface and a light incident surface. The touch module is disposed on the light emitting surface. The adhesive layer is disposed between the touch module and the light guide plate, and is located at the active area. The driving module is disposed between the touch module and the light guide plate, is located at the peripheral area, and includes a driving board, a touch control element, and a light emitting element. The driving board has a first surface and a second surface opposite to the first surface. The touch control element is disposed on the first surface and is electrically connected to the touch module. The light emitting element is disposed on the second surface and is adjacent to the light incident surface.

It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments of the present disclosure are discussed in detail below. It will be appreciated, however, that the embodiments provide many applicable concepts which may be implemented in a wide variety of specific contents. The discussed and disclosed embodiments are for illustrative purposes only and are not intended to limit the scope of patent applications in this case. The terms "first", "second", etc. used in the present disclosure do not specifically refer to order or precedence, but are used to distinguish elements or operations described with the same technical terms.

In addition, for ease of description, spatial relativity terms such as "under", "below", "lower", "above", "upper", and the like may be used herein to describe the relationship of one element or feature to another as illustrated in the figures. In addition to the orientations depicted in the figure, the spatial relative terms are intended to cover different orientations of the device in use or operation. Devices may be oriented in other ways (rotated 90 degrees or in other orientations) and the spatial relative terms used herein may be interpreted accordingly. As used in the present disclosure, "about," "approximately," "approximately" or "substantially" shall generally mean within 20%, or within 10%, or within 5% of a given value or range. Numerical quantities given in the present disclosure are approximate, which means that the terms "approximately," "approximately," "approximately" or "substantially" may be inferred in the absence of an express statement.

Figure 1A:
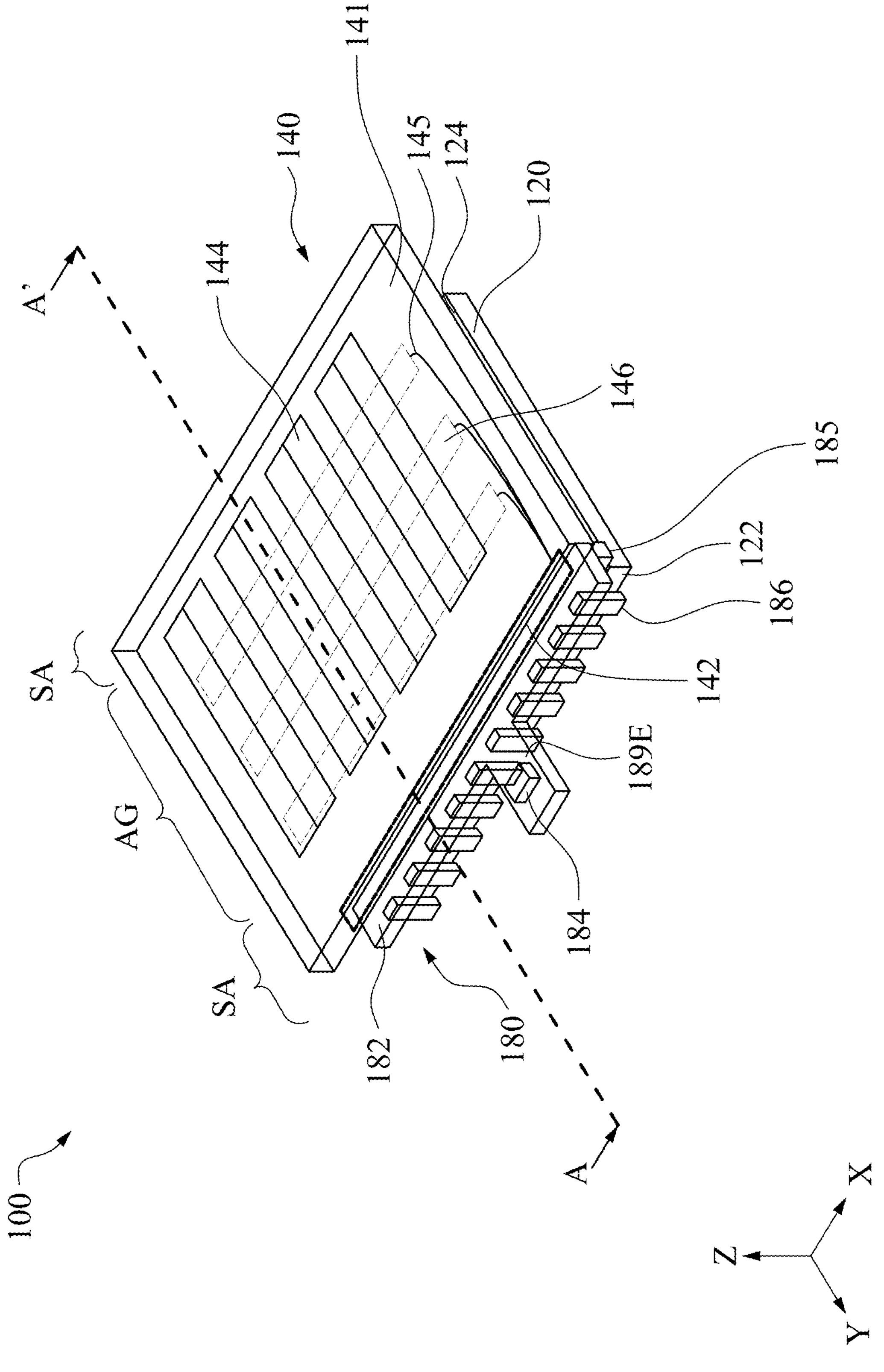
FIG. 1A is a schematic three-dimensional perspective view of a panel device according to at least one embodiment of the present disclosure.
Figure 1B:
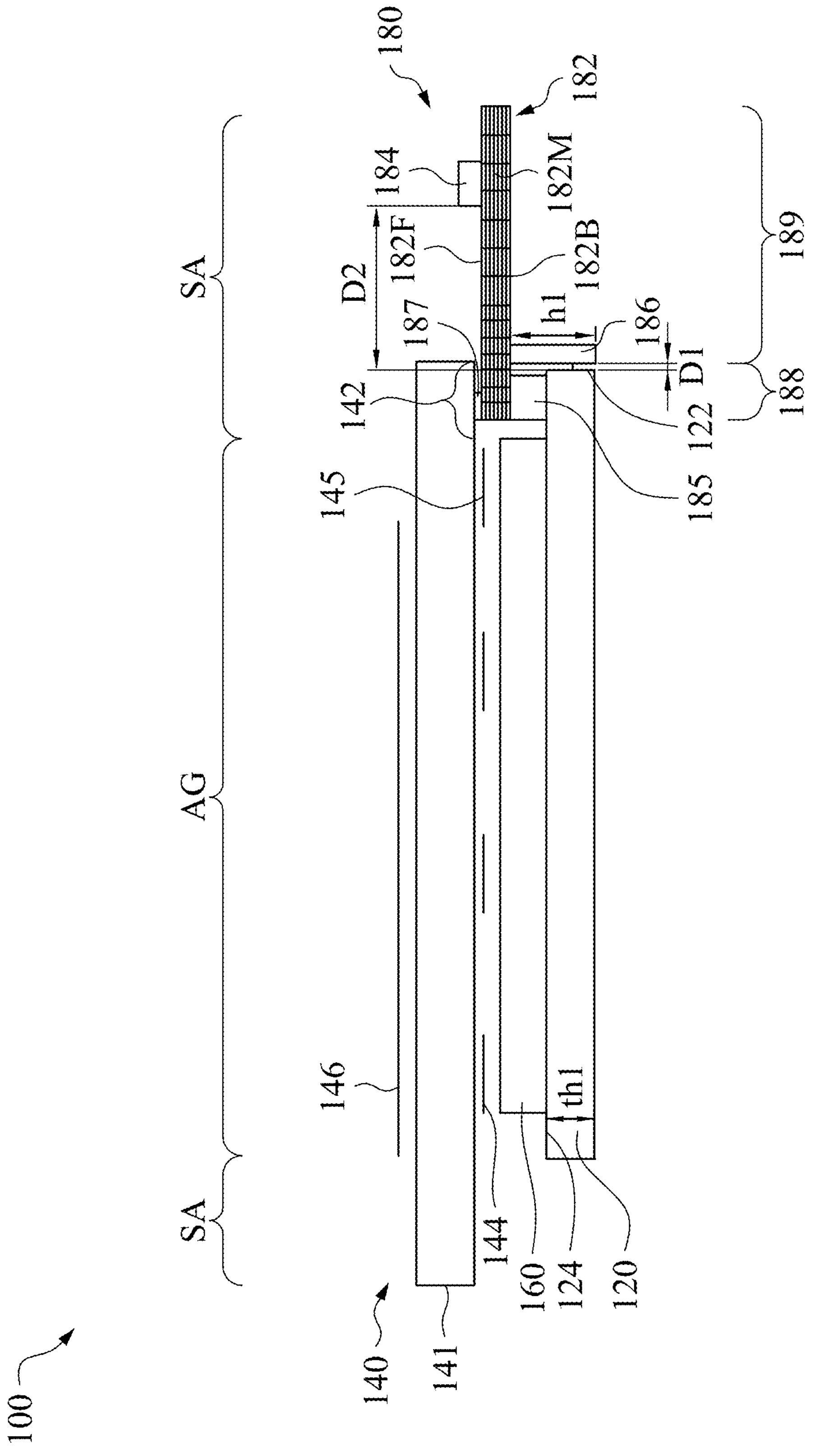
FIG. 1B is a schematic cross-sectional view taken along line A-A' of FIG. 1A.

FIG. 1A is a schematic three-dimensional perspective view of a panel device 100 according to at least one embodiment of the present disclosure. FIG. 1B is a schematic cross-sectional view taken along line A-A' of FIG. 1A. Referring to FIG. 1A and FIG. 1B, the panel device 100 may include a light guide plate 120, a touch module 140, an adhesive layer 160, and a driving module 180. The light guide plate 120, the touch module 140, the adhesive layer 160, and the driving module 180 are stacked in the axis Z. The panel device 100 may have an active area AG and a peripheral area SA disposed on at least one side of the active area AG, where the active area AG and the peripheral area SA correspond to the touch area and the trace area of the touch module 140, respectively. In some embodiments, the peripheral area SA may surround the active area AG.

In some embodiments, the light guide plate 120 may have a light incident surface 122 and a light emitting surface 124, where the light incident surface 122 may be located at a side surface of the light guide plate 120. The light guide plate 120 may include any suitable light guide material, such as glass, polycarbonate (PC), poly(methyl methacrylate (PMMA), or other suitable materials.

In some embodiments, the touch module 140 may be disposed on the light emitting surface 124 of the light guide plate 120, where the touch module 140 may cover the light guide plate 120. In some embodiments, the touch module 140 may exceed the light incident surface 122 of the light guide plate 120. In the active area AG (e.g. the touch area of the touch module 140), the touch module 140 may include multiple first touch electrodes 144, multiple second touch electrodes 146, and an isolation layer 141. The isolation layer 141 may include an appropriate insulating material, a glass substrate, etc. The isolation layer 141 can separate the first touch electrodes 144 from the second touch electrodes 146. The arrangement of the first touch electrodes 144 and the second touch electrodes 146 can be adjusted according to functional requirements. For example, in some embodiments, the first touch electrodes 144 and the second touch electrodes 146 may be interleaved. Specifically, as shown in FIG. 1A, in this embodiment, the first touch electrodes 144 are disposed on the upper surface of the isolation layer 141 and extend along the axis Y, and the second touch electrodes 146 are disposed on the lower surface of the isolation layer 141 and extend along the axis X. Two of the first touch electrodes 144 are arranged as a group at intervals and are substantially parallel to the axis Y. One of the second touch electrodes 146 is arranged as a group at intervals and is substantially parallel to the axis X, where the first touch electrodes 144 are substantially perpendicular to the second touch electrodes 146. However, it should be noted that the touch module 140 can be configured in any appropriate manner without being limited thereto.

In some embodiments, the adhesive layer 160 may be disposed between the light guide plate 120 and the touch module 140, and may be located at the active area AG of the panel device 100 to adhere the touch module 140 and the light guide plate 120. The lengths of the light guide plate 120, the touch module 140, and the adhesive layer 160 can be adjusted according to functional requirements. For example, in this embodiment, the length of the touch module 140 is greater than the length of the light guide plate 120, and the length of the adhesive layer 160 is less than the length of the touch module 140 and is less than the length of the light guide plate 120. Furthermore, the thickness of the adhesive layer 160 can be adjusted according to functional requirements to ensure good adhesion between the touch module 140 and the light guide plate 120, thereby increasing the reliability of the panel device 100. The adhesive layer 160 may include any suitable transparent adhesive material, such as optical clear resin or optical clear adhesive.

In some embodiments, the driving module 180 may be disposed between the touch module 140 and the light guide plate 120, and may be in the peripheral area SA of the panel device 100 (such as a trace bonding area 142 of the touch module 140). The driving module 180 may be an integrated driving module for driving the touch module 140 and the light guide plate 120.

In some embodiments, the driving module 180 may include a driving board 182, a touch control element 184, and a light emitting element 186. The driving board 182 is a board that can support various elements and includes wirings. In some embodiments, the driving board 182 may be a circuit board with appropriate rigidity. Alternatively, in some embodiments, the driving board 182 may have appropriate flexibility, such as a flexible circuit board. The driving board 182 may have a first surface 182F and a second surface 182B opposite to the first surface 182F. For example, the first surface 182F is the upper surface of the driving board 182 and the second surface 182B is the lower surface of the driving board 182. The touch control element 184 may be disposed on the first surface 182F of the driving board 182 and may be electrically connected to the touch module 140. The light emitting element 186 may be disposed on the second surface 182B of the driving board 182 and may be adjacent to the light incident surface 122 of the light guide plate 120.

In addition, as shown in FIG. 1A and FIG. 1B, in some embodiments, in the peripheral area SA of the panel device 100, the touch module 140 includes multiple traces 145 and the trace bonding area 142. The trace bonding area 142 may include multiple pads (not shown), and the pads may be connected to the first touch electrodes 144 and the second touch electrodes 146 through the traces 145. The trace bonding area 142 overlaps a first portion 188 of the driving board 182, where the driving board 182 includes multiple wirings 182M electrically connected to the trace bonding area 142 of the touch module 140 and the touch control element 184.

Figure 2A:
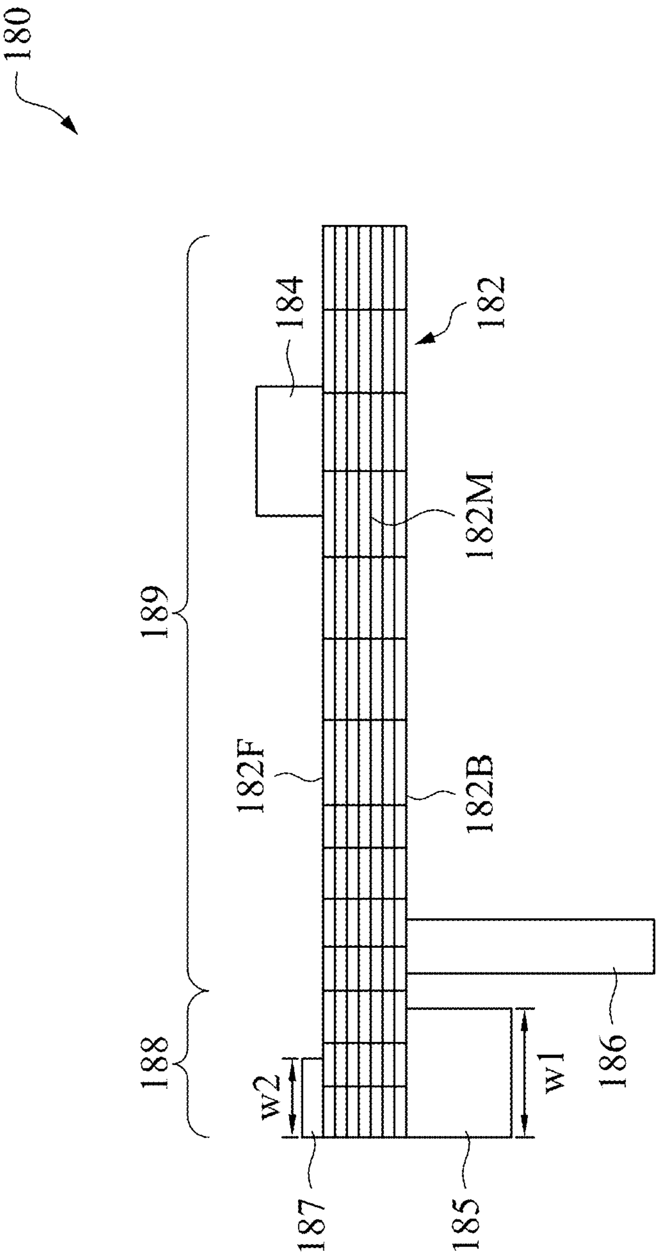
FIG. 2A is a schematic enlarged view of the driving module of FIG. 1B.

FIG. 2A is a schematic enlarged view of the driving module 180 of FIG. 1B. Referring to FIG. 1B and FIG. 2A, the driving board 182 may have the first portion 188 and a second portion 189. In this embodiment, the first portion 188 of the driving board 182 overlaps the light guide plate 120, and the second portion 189 of the driving board 182 extends beyond the light incident surface 122 of the light guide plate 120. In some embodiments, the touch control element 184 and the light emitting element 186 may be located at the second portion 189 of the driving board 182, and the first distance D1 between the light emitting element 186 and the light incident surface 122 of the light guide plate 120 is less than the second distance D2 between the touch control element 184 and the light incident surface 122 of the light guide plate 120. This design facilitates the light emitting element 186 to provide light to the light incident surface 122 of the light guide plate 120. In some embodiments, the height h1 of the light emitting element 186 may be greater than the thickness th1 of the light guide plate 120 so that the light emitting element 186 can be installed on the driving board 182 and provide light to the light incident surface 122 of the light guide plate 120. The light emitting element 186 may be any suitable light emitting component, such as a light emitting diode.

In some embodiments, the driving module 180 further includes an electrical connection member 187. The electrical connection member 187 is disposed on the first surface 182F of the driving board 182 and is used to connect to the pads of the trace bonding area 142 of the touch module 140 and the wirings 182M of the driving board 182. The electrical connection member 187 may include any suitable material, such as anisotropic conductive film.

In some embodiments, the driving module 180 further includes a connecting member 185. The connecting member 185 is disposed on the second surface 182B of the driving board 182 and is used to connect to the light guide plate 120. In some embodiments, the width w1 of the connecting member 185 is greater than the width w2 of the electrical connection member 187. The connecting member 185 may include any suitable material, such as adhesive glue, but it should be noted that this should not limit the scope of this embodiment.

Figure 2B:
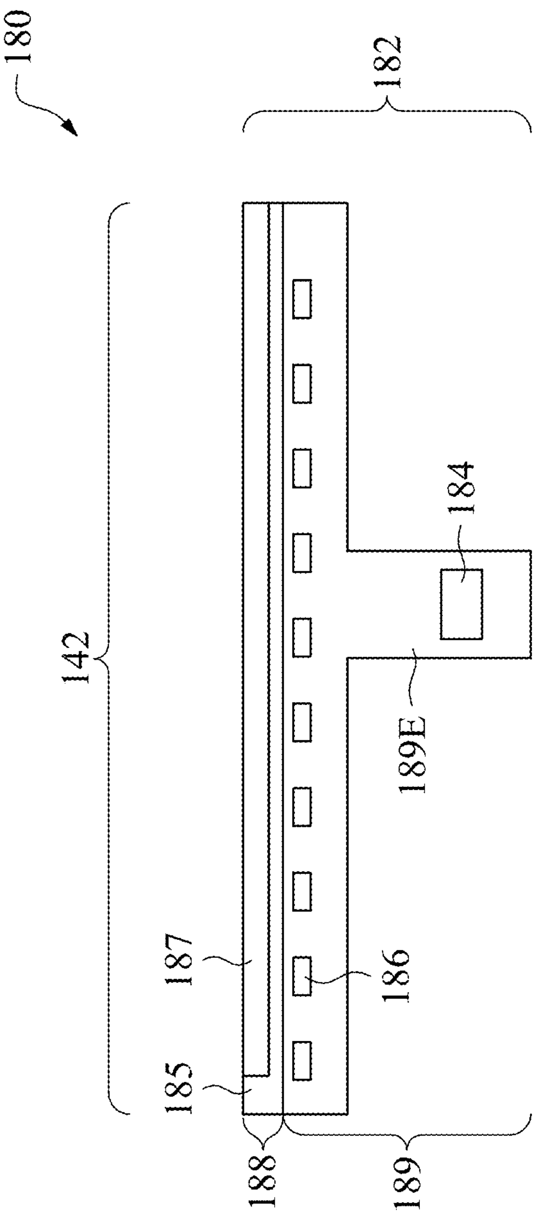
FIG. 2B is a partial schematic top perspective view of FIG. 2A.

FIG. 2B is a partial schematic top view of FIG. 2A. In this embodiment, the second portion 189 of the driving board 182 may include an extension portion 189E. The extension portion 189E extends away from the touch module 140 and the light guide plate 120, and the touch control element 184 is located at the extension portion 189E. However, it should be noted that this should not limit the scope of this embodiment. The shape of the driving board 182 of the driving module 180 can be adjusted to any suitable shape according to functional requirements.

The above-mentioned panel device 100 may be manufactured through any suitable manufacturing process. For example, the panel device 100 may be manufactured by the following process. For example, the adhesive layer 160 is disposed on the light guide plate 120. The adhering position of the adhesive layer 160 is adjusted to match the light emitting position of the light guide plate 120. The touch module 140 is disposed on the adhesive layer 160 so that the touch module 140 is adhered to the light emitting surface 124 of the light guide plate 120 through the adhesive layer 160. Next, the thickness of the adhesive layer 160 is adjusted to ensure good adhesion between the touch module 140 and the light guide plate 120. Before, during or after the process of using the adhesive layer 160 to adhere to the touch module 140 and the light guide plate 120, the driving module 180 may be adhered to the touch module 140 and the light guide plate 120 to drive the touch module 140 and light guide plate 120.

Before the driving module 180 is adhered to the touch module 140 and the light guide plate 120, the driving module 180 may be manufactured by the following process. As shown in FIG. 2A and FIG. 2B, the touch control element 184 is disposed on the first surface 182F of the driving board 182 through appropriate bonding methods, and the light emitting element 186 is disposed on the second surface 182B of the driving board 182. However, it should be noted that this should not limit the scope of this embodiment.

In summary, at least one embodiment of the present disclosure provides a panel device that reduces the mechanical interference between different modules by integrating the driving module of the touch module and the driving module of the light guide plate. The panel device also adjusts the position of the driving module to ensure the normal driving functions of the touch module and the light guide plate, thereby reducing fitting tolerances and increasing stability. Furthermore, by arranging the light emitting element and the touch control element on different sides of the driving board, on the one hand, the trace utilization of the panel device can be increased, and on the other hand, the adjustability of stacking thickness of the panel device can be increased, thereby ensuring the traces of the touch module and the traces of the light guide plate will not interfere with each other. The thickness and adhering position of the adhesive layer are adjustable to ensure good adhesion between modules. The trace area design of the panel device is adjustable that can be adjusted according to actual needs, thereby ensuring the trace efficiency and performance of the panel device. Therefore, the panel device can ensure the maximum active area by optimizing the integration of the light guide plate and the driving module to achieve a narrow bezel.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A panel device, having an active area and a peripheral area located at least one side of the active area, and comprising:

a light guide plate, having a light emitting surface and a light incident surface;

a touch module, disposed on the light emitting surface;

an adhesive layer, disposed between the touch module and the light guide plate, and located at the active area; and a driving module, disposed between the touch module and the light guide plate, located at the peripheral area, and comprising:

a single driving board, having a first surface and a second surface opposite to the first surface;

a touch control element, disposed on the first surface and electrically connected to the touch module;

an electrical connection member disposed on the first surface to connect to the touch module;

a light emitting element, disposed on the second surface and adjacent to the light incident surface; and a connecting member disposed on the second surface to connect to the light guide plate.

2. The panel device of claim 1, wherein the touch module further has a trace bonding area, and the single driving board comprises a plurality of wirings electrically connected to the trace bonding area and the touch control element.

3. The panel device of claim 1, wherein the electrical connection member includes an anisotropic conductive film.

4. The panel device of claim 1, wherein a first width of the connecting member is greater than a second width of the electrical connection member.

5. The panel device of claim 1, wherein a first distance between the light emitting element and the light incident surface is less than a second distance between the touch control element and the light incident surface.

6. The panel device of claim 1, wherein the touch module further comprises:

a plurality of first touch electrodes;

a plurality of second touch electrodes, interleaved with the first touch electrodes; and an isolation layer, separating the first touch electrodes from the second touch electrodes.

7. The panel device of claim 1, wherein the single driving board has a first portion and a second portion, wherein the first portion overlaps the light guide plate, and the second portion extends beyond the light incident surface.

8. The panel device of claim 7, wherein the touch control element is located at the second portion.

9. The panel device of claim 7, wherein the light emitting element is located at the second portion.

10. The panel device of claim 7, wherein the second portion comprises an extension portion extending away from the touch module and the light guide plate, and the touch control element is located at the extension portion.

11. The panel device of claim 1, wherein a height of the light emitting element is greater than a thickness of the light guide plate.

12. The panel device of claim 1, wherein a length of the touch module is greater than a length of the light guide plate.

13. The panel device of claim 12, wherein a length of the adhesive layer is less than a length of the touch module and is less than a length of the light guide plate.

* * * * *